March 29, 1932. M. F. POWERS 1,851,111
TOOL HEAD, HANDLE THEREFOR, AND HANDLE ATTACHING MEANS
Original Filed July 29, 1924 2 Sheets-Sheet 1
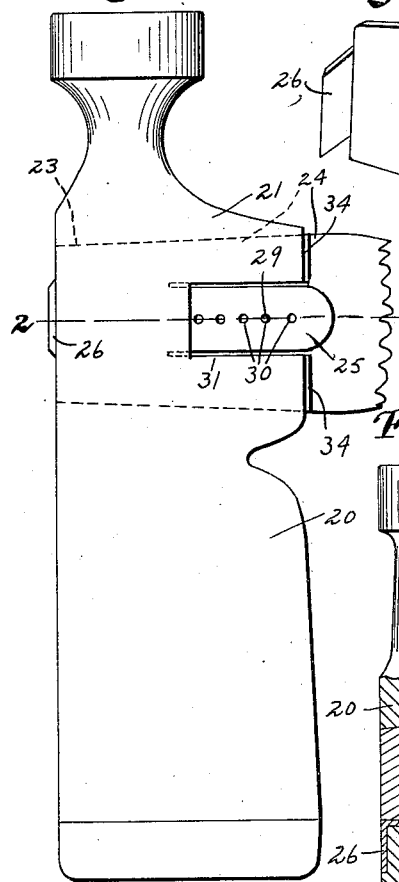
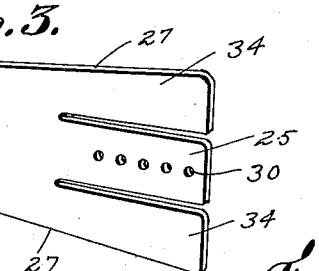
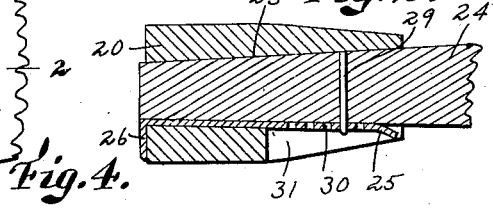
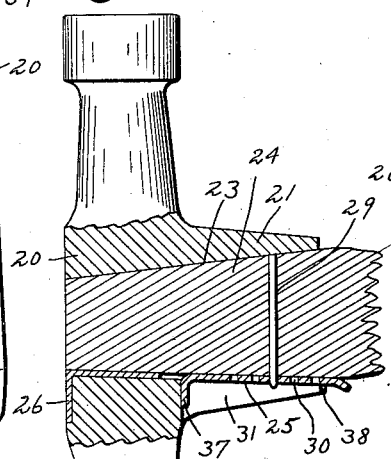
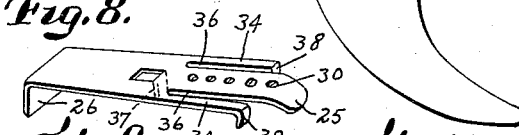
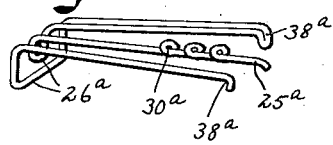
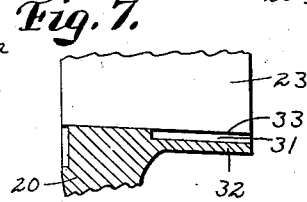
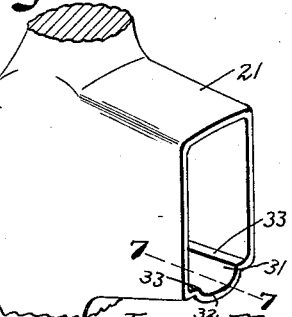
Inventor
M. F. Powers March 29, 1932. M. F. POWERS 1,851,111
TOOL HEAD, HANDLE THEREFOR, AND HANDLE ATTACHING MEANS
Original Filed July 29, 1924  2 Sheets-Sheet 2
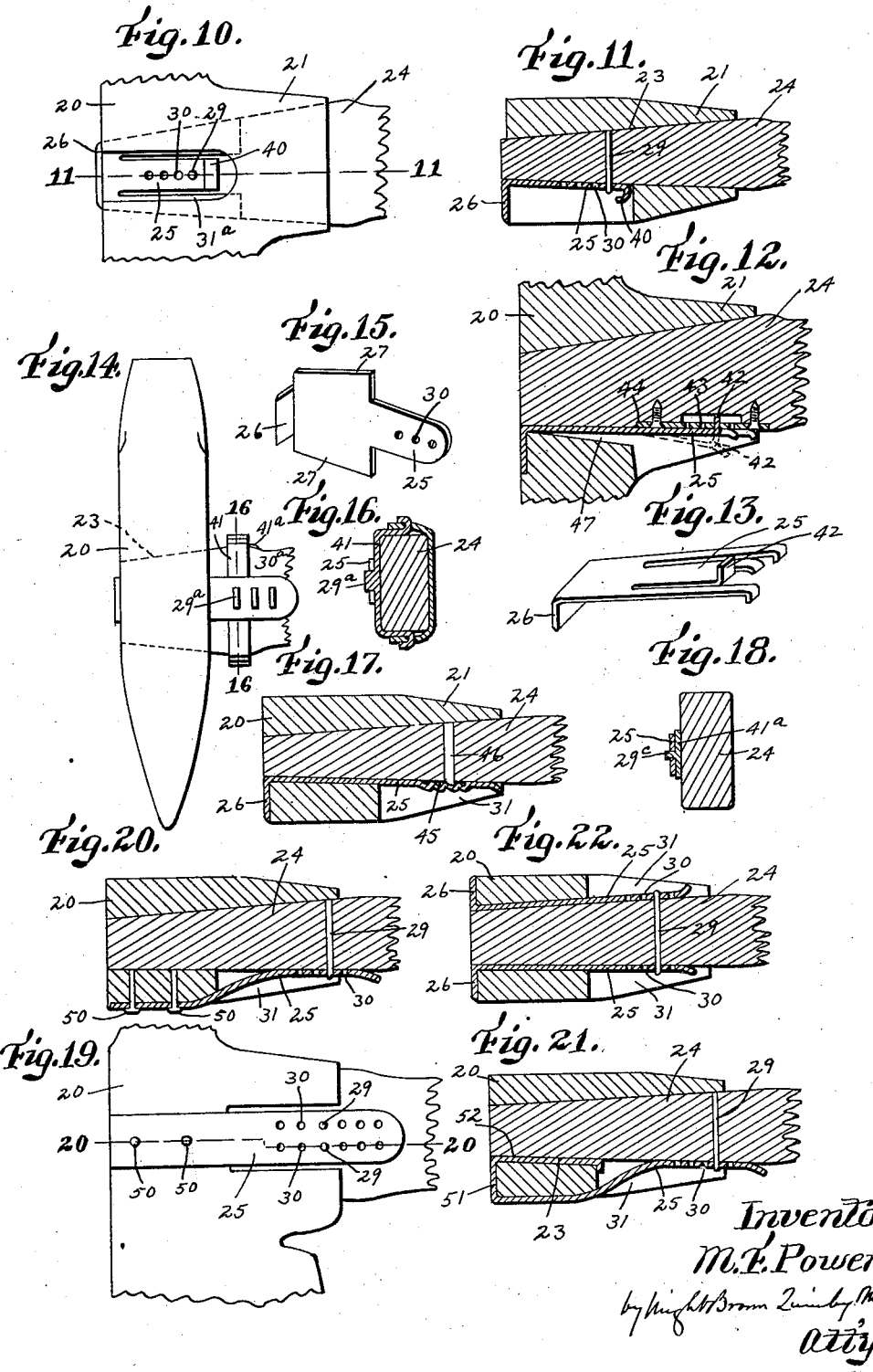
Inventor
M. F. Powers Patented Mar. 29, 1932

1,851,111

UNITED STATES PATENT OFFICE

MILTON F. POWERS, OF WINCHESTER, MASSACHUSETTS

TOOL HEAD, HANDLE THEREFOR, AND HANDLE-ATTACHING MEANS

Application filed July 29, 1924, Serial No. 728,981. Renewed August 5, 1931.

This invention relates to a tool such as a hatchet or other like cutting tool or a hammer or other like driving tool, including a metal head having a handle-receiving eye and a handle usually of wood inserted and fixed in the eye.

It is well known that when the handle breaks, the portion remaining in the eye has to be removed, the removal being usually a matter of considerable difficulty. It is also well known that the portion of the handle which enters the eye often works loose, the tightening of the handle being also usually a matter of considerable difficulty.

The chief object of my invention is to provide an improved form of the eye, an improved form of the inserted portion of the handle, and improved means for fixing the handle in the eye, to the ends that first the inserted portion of a broken handle may be quickly and conveniently removed, and replaced by another, and secondly that a loosened handle may be much more quickly and conveniently tightened than heretofore.

Another object is to make it feasible for a tool manufacturer to put upon the market, in addition to complete tools ready for use, spare or extra handles as standard articles of manufacture ready for insertion in tool heads without the necessity at present existing of re-shaping or trimming the handles, so that a consumer, having a tool with a broken handle, may not only quickly remove the handle from the head, but may replace it by a new handle without loss of time in adapting the new handle to the head eye.

I attain these and other related objects by the improvements hereinafter described and claimed.

Of the drawings forming a part of this specification,—

Figure 1 is a side view of a hatchet embodying the invention, a portion of the handle being broken away in this and the other figures showing the handle.

Figure 2 is a section on line 2—2 of Figure 1.

Figure 3 is a perspective view of the anchoring member shown by Figures 1 and 2.

Figure 4 is a sectional view showing a claw hammer embodying the invention.

Figure 5 is a fragmentary perspective view showing a portion of the head shown by Figure 4.

Figure 6 is a view similar to Figure 5 showing a guard.

Figure 7 is a fragmentary section on line 7—7 of Figure 6.

Figure 8 is a perspective view of the anchoring member shown by Figure 4.

Figure 9 shows a modified form of anchoring member.

Figure 10 is a fragmentary side view showing a modified arrangement of the anchoring member and of the recess in the head.

Figure 11 is a section on line 11—11 of Figure 10.

Figure 12 is a view similar to Figure 4 showing a different arrangement of the locking means.

Figure 13 is a perspective view of the anchoring member shown by Figure 12.

Figure 14 is a side view showing a different type of hammer embodying the invention.

Figure 15 is a perspective view of the anchoring member shown by Figure 14.

Figure 16 is a section on line 16—16 of Figure 14.

Figure 17 is a view similar to Figure 2 showing another arrangement of the locking means.

Figure 18 is a view similar to Figure 16 showing a modification.

Figure 19 is a view similar to a portion of Figure 1, showing another modification.

Figure 20 is a section on line 20—20 of Figure 19.

Figure 21 is a view similar to Figure 20 showing another modification.

Figure 22 is a view similar to Figure 2 showing another modification.

The same reference characters indicate the same parts in all of the figures.

20 designates a head which may be the head of a hatchet, as shown by Figure 1, the head of a claw hammer, as shown by Figure 4, or the head of a machinist's hammer, as shown by Figure 14. These heads are shown as examples and it will be obvious that the invention hereinafter described may be embodied in other tools the heads of which are otherwise formed.

In each case the head is provided with a tapered eye 23 which decreases in size from its inner to its outer end, the smaller end being at the outer face of the head. In each case the portion 24 of the handle which enters the eye is correspondingly tapered, the form of the eye being such that the handle is insertible in the eye, by an outward endwise movement which is limited by the eye, tapering faces of the handle abutting against tapering walls of the eye when the handle is fully inserted. The eye is enlarged so that a space is provided between a face of the handle and a wall of the eye for the reception of an anchoring member inserted beside the handle and filling said space, the anchoring member being closely confined between the eye and the handle and not only preventing any looseness of the handle in the eye when the handle is first inserted, but also permitting adjustment of the handle to take up any looseness which may subsequently develop.

The anchoring member is preferably a plate of resilient material and includes head-engaging means preventing displacement of the anchoring member in any direction when the handle is inserted in the eye 23, and a resilient locking tongue 25 which normally bears on the handle and is adapted to be sprung outward therefrom.

Preferably the head-engaging means includes an ear 26 bent outward from one end of the body portion of the member and seated on the outer portion of the head to oppose inward endwise movement of the anchoring member, and oppositely inclined longitudinal edges 27 (Figure 3) seated on oppositely inclined walls of the eye to oppose outward endwise movement of said member.

The tongue 25 and the handle are provided with complemental locking members normally interlocked to prevent endwise movement of the handle and separable by the displacement of the tongue from its normal position to permit the removal of the handle from the head.

One of the parts called respectively the tongue and the handle is a multiple locking member, or in other words is provided with a plurality of spaced apart keepers and the other part is provided with a single locking member, said members being arranged to permit the locking of the handle in different longitudinal positions, so that when the handle becomes loose in the eye, the tongue may be displaced to release the handle and the handle may then be tightened by driving it into the eye until another of the plurality of keepers engages the single locking member.

The single locking member is preferably a stud 29 fixed to and projecting from the handle and the multiple locking member is preferably provided by forming keepers formed as orifices 30 in the tongue 35, the spaces between said keepers being narrow, so that the keepers are in close proximity to each other.

When the eye 23 is of considerable length, as in a hatchet or a hammer head, I provide the head with a recess 31 communicating with a portion of the eye, and registering with the tongue 25, the tongue being adapted to be moved or sprung outward into the recess to release the handle. The width of the recess 31 will depend on the width of the tongue 25, each being as wide or narrow as may be desired. In a hatchet the recess 31 is preferably formed in one of the side faces of the usual extension 21 at the inner side of the head, as shown by Figures 1 and 2, while in a hammer the recess is preferably formed in the under side of the extension 21, as shown by Figures 4 and 5. An arched or offset guard 32 extending across the recess may be provided as shown by Figures 6 and 7 to protect the tongue and strengthen the recessed portion of the head. The recess 31 is narrower than the wall of the eye in which it is formed, as best shown by Figure 5, so that portions of said wall form seats 33 on which the edge portions 27 of the anchoring member bear. Said edge portions may be on wings 34 separated by slots 36 from the longitudinal edges of the tongue 25. The wings 34 are laterally confined between the handle shank and the head eye, so that they are not laterally flexible. The portion of the anchoring member between the wings and constituting the tongue 25, is not confined like the wings and is laterally flexible, as described.

The laterally confined wings are adapted to oppose movement of the anchoring member by the handle when the latter is being driven into the eye, such adaptation being due to the inclined outer edges 27 of said wings contacting with the entire length of the eye, as indicated by Figure 1, when the anchoring member is of the width indicated by Figures 1 and 3. When the anchoring member is narrower, as indicated by Figure 8, said adaptation is due to the ears 38, held by the laterally confined wings against an external surface portion of the head, as indicated by Figure 4.

The width of the slots 36 must be sufficient to prevent the wings from binding on the edges of the tongue 25.

The anchoring member employed with a hatchet may be considerably wider than that employed with a hammer as may be seen by comparing Figure 3 with Figure 8. The anchoring member may be provided with additional head-engaging means embodied in an inner ear 37 (Figures 4 and 8) seated on an inner portion of the head. Said additional means may include also bent extensions 38 on the wings 34 adapted to bear on another inner portion of the head. There may be but one extension 38 if desired.

The anchoring member, particularly when made relatively narrow, may be of wire, as shown by Figure 9, in which 25a designates the resilient tongue, 30a the keepers formed by loops or eyes into which the tongue is bent, 26a an outer ear corresponding to the ear 26, and 38a bent extensions corresponding to the extensions 38.

Figures 10 and 11 show a modification in which instead of a recess 31 in the rear portion of the head, there is provided a recess 31a in the forward portion of the head. The tongue 25 is located in the recess 31a and may be provided with a hook or projection 40 at its free end adapted to be engaged by a device used for springing the tongue outward.

When the invention is embodied in a hammer of the type shown by Figure 14, the eye being relatively short, the anchoring member, shown separately by Figure 15, is correspondingly proportioned, and the tongue 25 projects from the body portion of the anchoring member and is entirely exposed at one side of the handle, the anchoring member being provided, as in the examples previously described, with the ear 26 and with the inclined edges 27, preventing displacement of the anchoring member in any direction when the handle is inserted in the eye. The wings 34 in this case may be omitted.

The stud 29 is preferably a pin having its major portion embedded in the handle as shown by Figures 2 and 4. If desired, however, the stud may be formed on a sleeve 41 (Figures 14 and 16) surrounding the handle, the stud, here designated by 29a, being an oblong ear projecting from the sleeve into either of a plurality of oblong sockets in the tongue, the sockets being here designated by 30a. The sleeve 41 may be prevented from moving edgewise on the handle by being applied to a tapered portion of the handle which prevents edgewise movement of the sleeve in one direction, and by providing the handle with a projection 41a (Figure 14) preventing edgewise movement of the sleeve in the opposite direction. The stud may be formed on a plate which is secured to one side of the handle as in the modification shown by Figure 18 in which 29c designates the stud and 41a the plate.

Instead of forming the tongue as a multiple locking member and attaching the single locking member to the handle, I may reverse the arrangement as shown by Figures 12 and 13. In this case I provide the tongue 25 with a stud 42 adapted to enter either one of a series of keepers 43 in a reinforcing plate 44 fixed to the handle.

As shown by Figure 17 the tongue 25 may be provided with keepers 45 formed as ratchet teeth adapted to engage a single ratchet tooth 46 fixed to the handle, the arrangement being such that when the handle is driven forward into the eye the tongue yields while the tooth 46 is passing from one keeper 45 to the next, the tongue springing inward to engage the last mentioned keeper with the tooth 46. One side of the eye 23 may have an offset face portion 47 arranged to permit a maximum amplitude of displacement of the tongue 25, as shown by Figure 12.

It will now be seen that the described parts may be assembled by first inserting the anchoring member in the eye and engaging it with the head, then inserting the tapered portion of the handle in the socket formed by the eye and the thin anchoring member while the tongue 25 is sprung outward, and finally allowing the tongue to spring inward and engage the locking means on the handle. When the handle becomes loose by shrinkage, the tongue may be sprung outward to separate the locking means, and the handle forced forward and thus tightened, the handle being again locked by the inward springing of the tongue. The ease and convenience of removing from the eye a portion of a broken handle and substituting a new handle therefor will be obvious.

The handle having a tapered portion insertible in a tapered socket formed by a tapered eye and an anchoring member inserted in the eye, said tapered handle portion having at one side locking means adapted to engage complemental resilient locking means carried by the anchoring member, constitutes an article of manufacture which may be supplied to a consumer and engaged with said socket without reshaping by the consumer.

It is obvious that instead of employing a single anchoring member, as shown by the drawings, there may be any desired number of anchoring members located at different sides or walls of the eye, and that when the head is adapted to be recessed, there will be as many recesses 31 as there are anchoring members.

A portion of the locking tongue 25 may be seated on the outer side of the head 20 as shown by Figures 19, 20, and 21, and either positively secured to the head as by rivets 50 (Figures 19 and 20), or separably secured as by an extension 51, 52, of one end of the tongue bearing on a face of the head and a face of the socket 23 as shown by Figure 21, the portion 52 of said extension bearing also on the tapered handle portion 24. The locking tongue 25 may be provided with more than one row of keepers 30, and the handle with more than one stud 29 as indicated by Figure 19, which shows two rows of keepers 30 and two studs 29. There may be more than two rows of keepers and more than two studs, if desired, and these may be arranged in any suitable way. As previously stated, there may be any desired number of anchoring members or locking tongues 25 located at different sides or walls of the eye, and as many recesses 31 as there are anchoring members. An example of this is shown by Figure 22, which shows two locking tongues 25 and two recesses 31, the stud 29 projecting from opposite sides of the handle.

When the head 20 is that of a claw hammer, the outer face of the head should be recessed as shown by Figure 4, to receive the ear 26, so that the ear is flush with said face and does not form a projection thereon. In other tools, such as hatchets, the recess may be omitted and ear 26 may form a projection as shown by Figure 1.

Any tool embodying my invention is characterized by a head having a tapered eye, and a handle having a tapered end portion or shank, said eye and shank being so tapered that the shank is firmly seated on the walls of the eye when the handle is driven toward the head, to force the shank into the eye.

In any tool thus characterized looseness of the handle shank in the eye may be taken up by additionally driving the handle toward the head and thereby reseating the shank on the walls of the eye.

It will be seen that I have combined with a tool characterized as above stated. locking means adapted to automatically lock the handle in successive seated and reseated positions of its shank in the eye, said means including a locking element associated with and movable by the handle, and a locking element associated with the head and confined against movement with the handle, one of said elements being single, while the other is multiple and includes a row of keepers, any one of which is adapted to engage the single element. An example of the single element is the stud 29, and an example of the multiple element is the tongue 25 having keepers 30.

When the handle is first applied, it is locked with its shank in its first seated position, and when the handle is additionally driven to take up looseness of its shank, the latter is reseated and again locked. The handle may therefore be locked in as many reseated positions as may be required.

As implied in the foregoing specification and in the following claims, I am not limited to the specific embodiments of the invention shown by the drawings, except as otherwise required in certain of the more limited claims.

I claim:

1. A tool of the character stated, comprising, in combination, a head having a tapered eye, a handle having a tapered eye-engaging shank, the taper of the eye and shank permitting the seating of the shank on the walls of the eye when the handle is driven toward the head, and the reseating of the shank to take up looseness thereof, when the handle is additionally driven toward the head, and locking means adapted to automatically lock the handle in successive seated and reseated positions of its shank, said means including a locking element associated with and movable by the handle, and a locking element associated with the head and confined against movement with the handle, one of said elements being single, while the other element is multiple and includes a row of closely spaced keepers, any one of which is adapted to automatically engage the single element when the shank is seated on the walls of the eye.

2. A tool characterized as stated by claim 1, one of said locking elements being rigid and confined by the handle, the other element being a resilient tongue having a free end portion normally pressed by its resilience toward the rigid element and adapted to be flexed outward therefrom.

3. A tool characterized as stated by claim 1, the single locking element being rigid and confined by the handle, the multiple element being a resilient tongue having a free end portion normally pressed by its resilience toward the rigid element and adapted to be flexed outward therefrom, said tongue having a row of closely spaced keepers.

4. A tool characterized as stated by claim 1, one of said elements being a thin anchoring member of resilient material interposed between one side of the handle shank and the head eye, said member having longitudinal slots subdividing its outer end portion into wings laterally confined between the shank and eye, and a resilient tongue free to be flexed between the confined wings, said member having means for preventing movement thereof in one direction by the handle when the latter is being driven into the eye.

5. A tool characterized as stated by claim 1, one of said elements being a thin anchoring member of resilient material interposed between one side of the handle shank and the head eye, said member having longitudinal slots subdividing its outer end portion into wings laterally confined between the shank and eye, and a resilient tongue free to be flexed between the confined wings, said member having means for preventing movement thereof in one direction by the handle when the latter is being driven into the eye, and a stop ear 26 bearing on the exterior of the head to prevent movement of the member in the opposite direction.

6. A tool of the character stated comprising, in combination, a metal head having a tapered eye, decreasing in size from its inner to its outer end, the head being provided with a lateral recess communicating with the eye, a wood handle having a tapered portion inserted in and conforming to the taper of the eye, so that looseness of the handle caused by shrinkage and wear thereof may be taken up by additionally driving the handle into the eye, and means for automatically locking the handle to the head in each of the positions to which it may be driven, said means including an anchoring member fixed to the head and provided with a resilient locking part formed as a tongue normally sprung inward against a portion of the handle, and arranged to be sprung outward in said recess, and a complemental locking part fixed to the handle, one of said locking parts being single and formed by a stud, while the other locking part is multiple and formed by a row of keepers extending lengthwise of the path of movement of the handle into the eye, any one of the keepers being adapted to engage the stud, so that looseness of the handle may be taken up by disengaging one keeper from the stud and additionally driving the handle into the eye to engage another keeper with the stud, the recess being formed to protect the tongue when the tool is in use.

7. A tool of the character stated, comprising, in combination, a head having a tapering eye decreasing in size from its inner to its outer end, a handle having a tapered portion inserted in and conforming to the taper of the eye, so that outward endwise movement of the handle is limited by the tapered walls of the eye, the eye being enlarged to provide a narrow space between one of its walls and the corresponding side of the handle, a thin anchoring member occupying said space and confined against endwise movement therein by the head and the inserted portion of the handle, said member having a locking part formed as a resilient tongue normally sprung inward against a portion of the handle, and exposed, so that it may be manually sprung outward from the handle, and a complemental locking part fixed to the handle, one of said locking parts including a stud, while the other locking part includes a keeper adapted to engage the stud and thereby lock the handle to the anchoring member, said stud and keeper being interengageable by the operation of forcing the tapered portion of the handle into the eye.

In testimony whereof I have affixed my signature.

MILTON F. POWERS.